(12) United States Patent
Waarts

(10) Patent No.: US 6,185,230 B1
(45) Date of Patent: Feb. 6, 2001

(54) RESONANT PUMPED SHORT CAVITY FIBER LASER

(75) Inventor: Robert Waarts, Fremont, CA (US)

(73) Assignee: SDL, Inc., San Jose, CA (US)

( * ) Notice: Under 35 U.S.C. 154(b), the term of this patent shall be extended for 0 days.

(21) Appl. No.: 09/440,554

(22) Filed: Nov. 15, 1999

Related U.S. Application Data

(62) Division of application No. 08/970,745, filed on Nov. 14, 1997, now Pat. No. 6,041,070.

(51) Int. Cl.[7] .................................................. H01S 3/067
(52) U.S. Cl. ...................... 372/6; 372/29.011; 372/29.02; 372/96; 372/102
(58) Field of Search ............................... 372/6, 9, 29, 32, 372/33, 38, 96, 99, 102

(56) References Cited

U.S. PATENT DOCUMENTS

| | | |
|---|---|---|
| 4,330,763 | 5/1982 | Esterowitz et al. . |
| 4,856,009 * | 8/1989 | Hall et al. ................................. 372/32 |
| 5,050,183 | 9/1991 | Duling, III . |
| 5,086,432 | 2/1992 | Esterowitz et al. . |
| 5,140,456 | 8/1992 | Huber . |
| 5,142,542 | 8/1992 | Dixon . |
| 5,200,966 | 4/1993 | Esterowitz et al. . |
| 5,237,576 | 8/1993 | DiGiovanni et al. . |
| 5,263,036 | 11/1993 | De Bernardi et al. . |
| 5,305,335 | 4/1994 | Ball et al. . |
| 5,323,404 | 6/1994 | Grubb . |
| 5,457,760 | 10/1995 | Mizrahi . |
| 5,497,265 | 3/1996 | Fontana et al. . |
| 5,506,723 | 4/1996 | Junginger . |
| 5,511,083 | 4/1996 | D'Amato et al. . |
| 5,530,710 | 6/1996 | Grubb . |
| 5,561,675 | 10/1996 | Bayon et al. . |
| 5,563,733 | 10/1996 | Mitsuda et al. . |
| 5,564,832 | 10/1996 | Ball et al. . |
| 5,682,397 | 10/1997 | Scheps . |
| 5,684,590 * | 11/1997 | Sanders et al. ..................... 372/32 X |
| 5,991,314 * | 11/1999 | Ionov et al. ............................. 372/6 |
| 6,034,976 * | 3/2000 | Mossberg et al. ..................... 372/32 |

OTHER PUBLICATIONS

R.W.P. Drever et al.; Laser Phase and Frequency Stabilization Using an Optical Resonator; Applied Physics B 31, (1983); pp. 97–105.

* cited by examiner

Primary Examiner—John D. Lee
(74) Attorney, Agent, or Firm—Kudirka & Jobse, LLP

(57) ABSTRACT

A fiber laser or fiber amplifier uses resonant pumping of the gain medium by providing a pump resonator that establishes a resonator cavity at the pump wavelength which includes the pumped gain medium. The pump resonator may be of a distributed feedback (DFB) or a distributed Bragg reflector (DBR) type construction, and may be combined with signal reflection apparatus of either DFB or DBR type construction that provides oscillation of the desired laser output wavelength. If used without a signal reflection apparatus, the invention may be operated as a resonant pumped fiber amplifier. Resonant pumped lasers may be arranged in series to provide a laser apparatus with a selectable output wavelength. The different laser stages each provide resonance for a different pump wavelength, and each provide resonance for a different signal wavelength. Thus, a particular pump wavelength input to the series arrangement only resonates in one of the laser stages, and therefore only pumps the gain medium of that stage, allowing it to output its unique signal wavelength. The output signals from each laser stage may be coupled out of the series arrangement with wavelength selective optical couplers, each associated with a different laser stage. A resonant pumped laser may use a wavelength stabilized pump source to maximize pumping efficiency, the stabilization being provided by a feedback signal, preferably an electrical feedback signal.

42 Claims, 6 Drawing Sheets

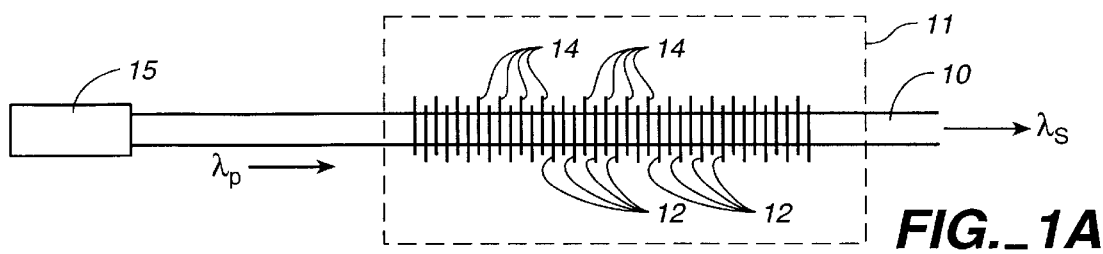
FIG._1A
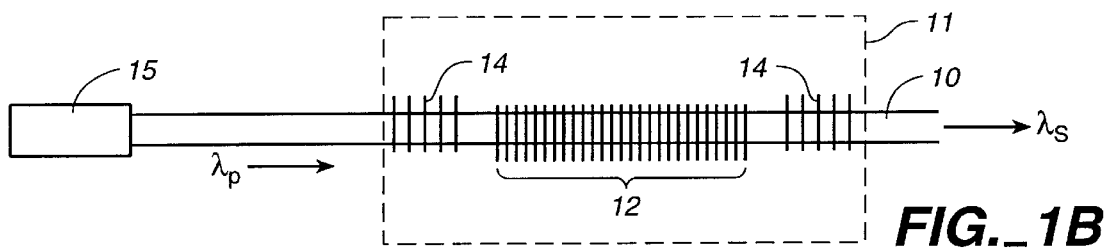
FIG._1B
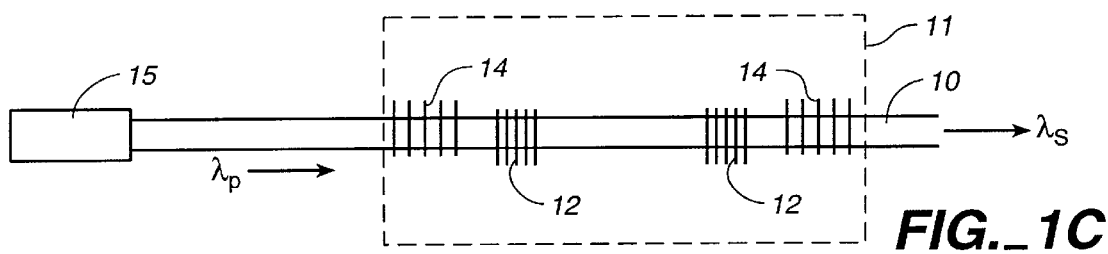
FIG._1C
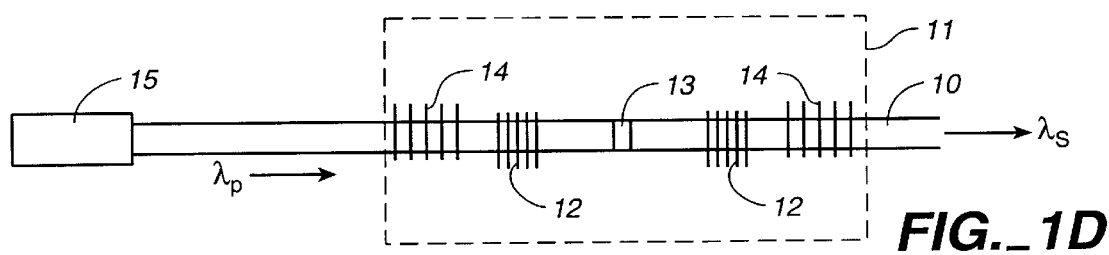
FIG._1D
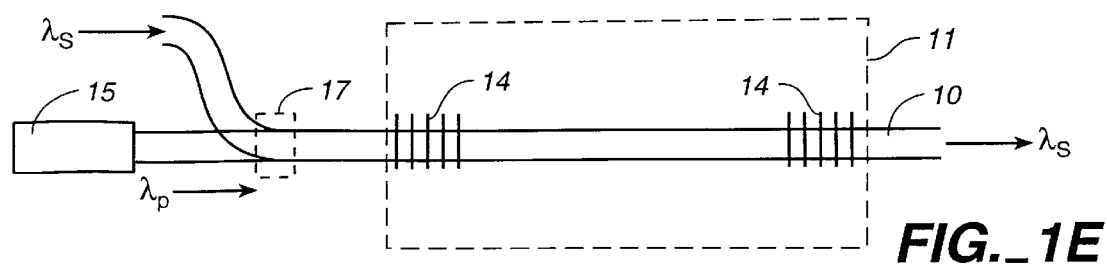
FIG._1E

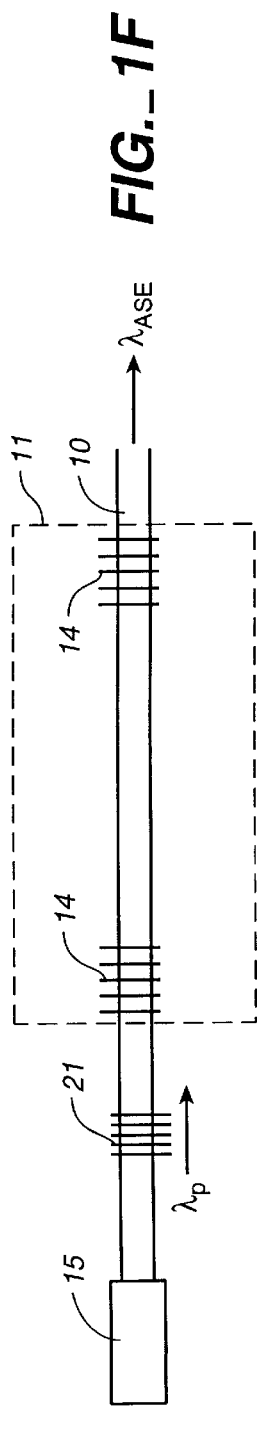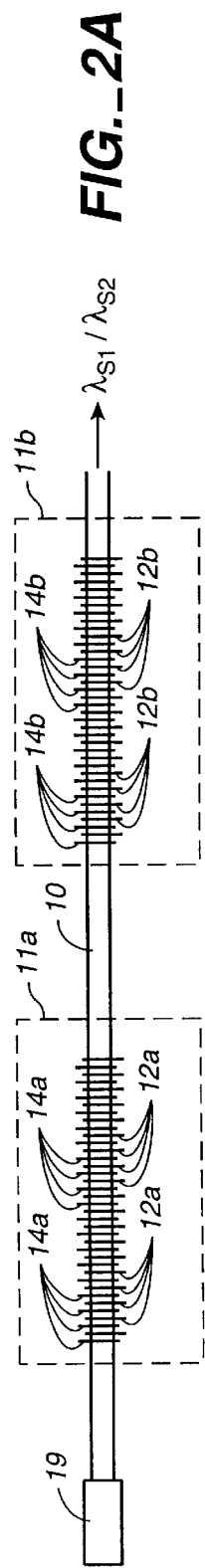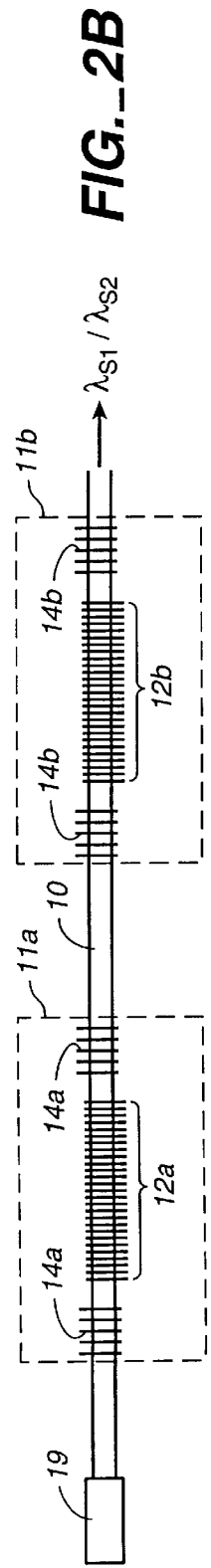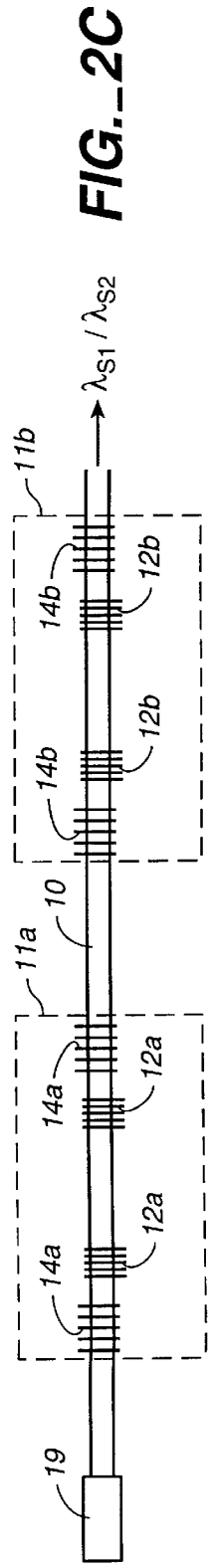

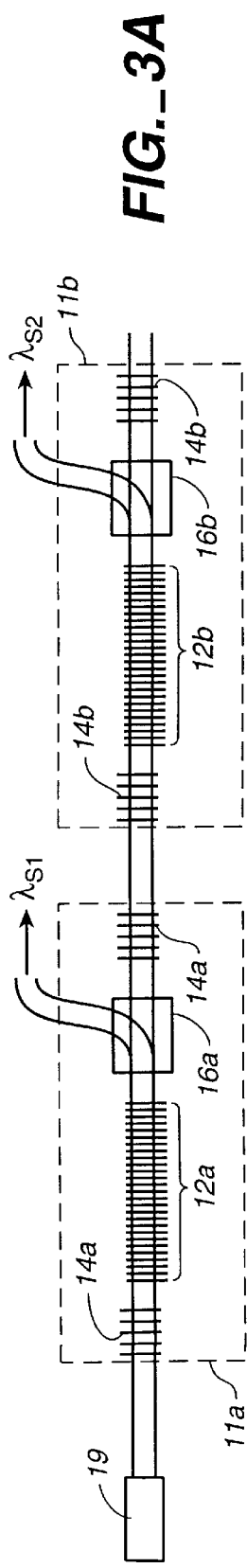
FIG._3A
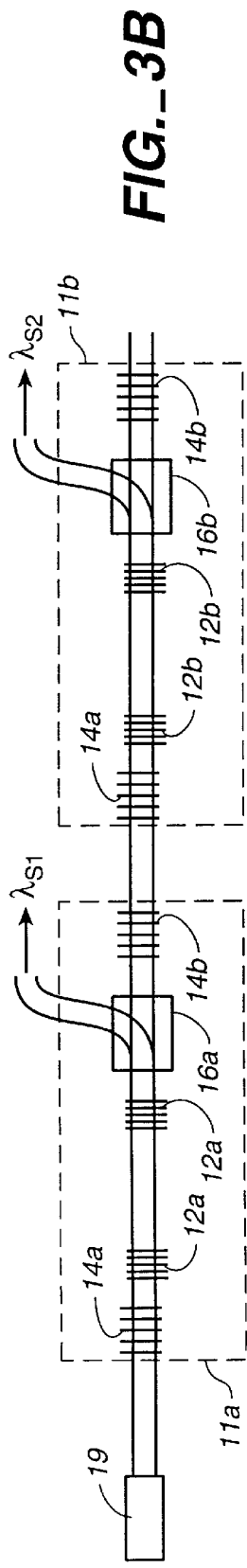
FIG._3B
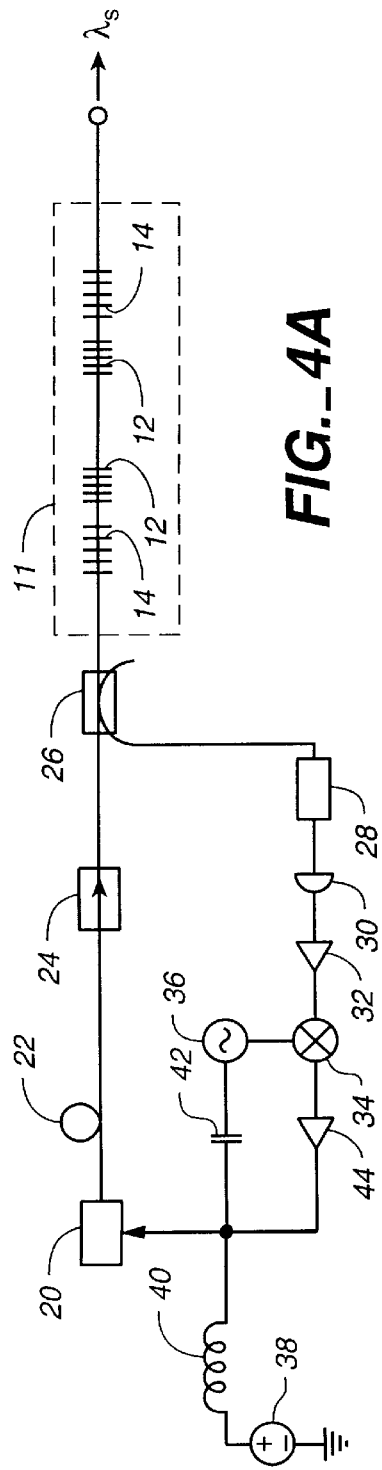
FIG._4A

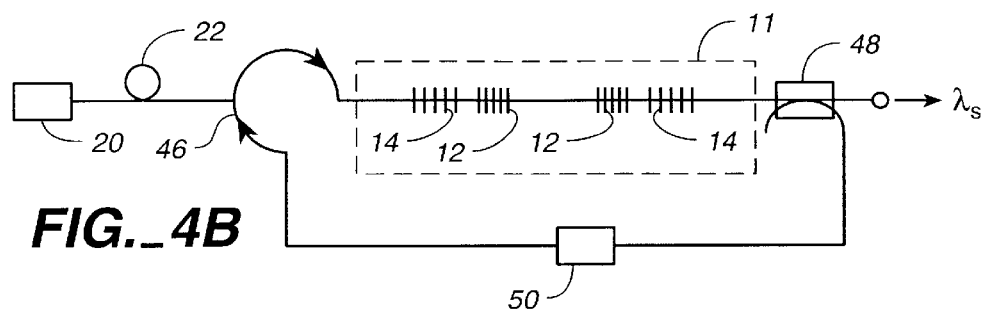
FIG._4B
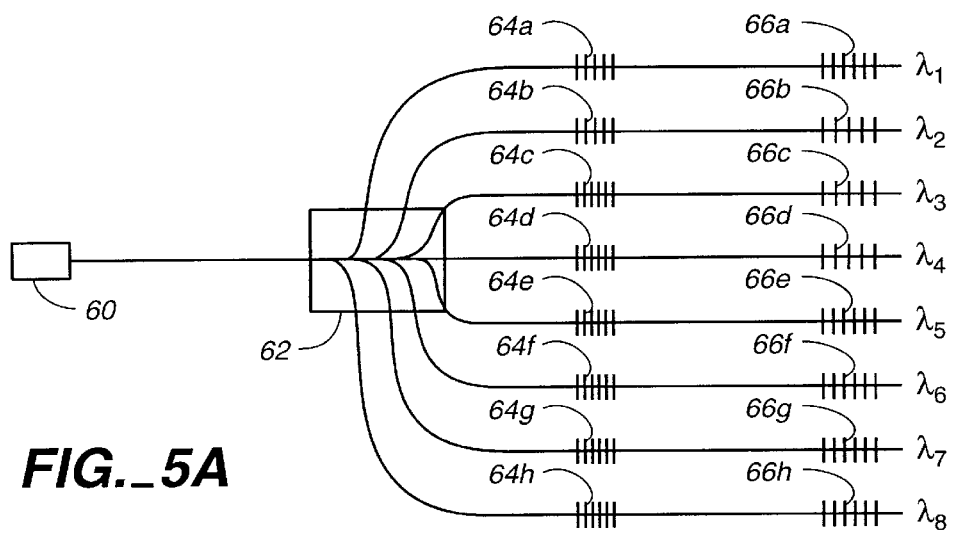
FIG._5A
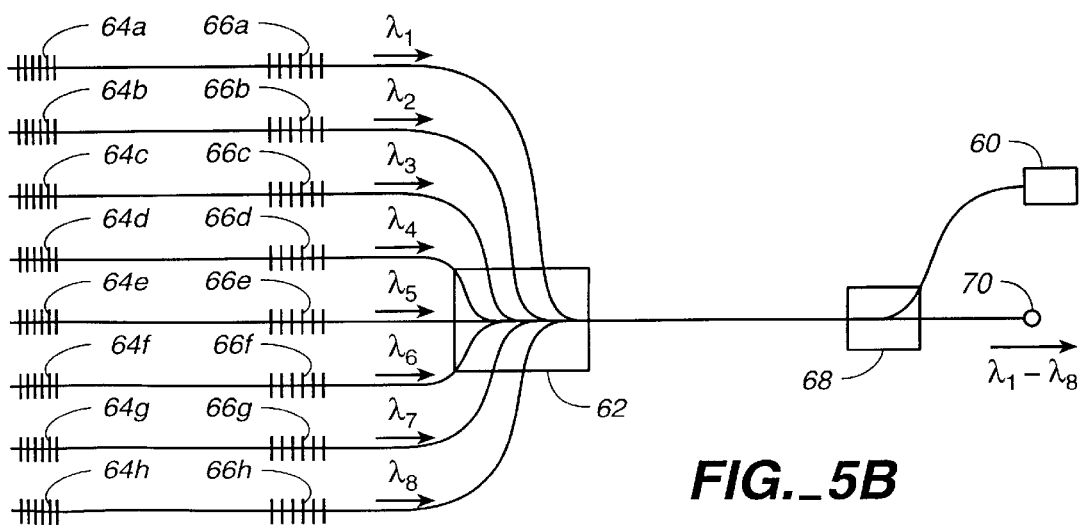
FIG._5B

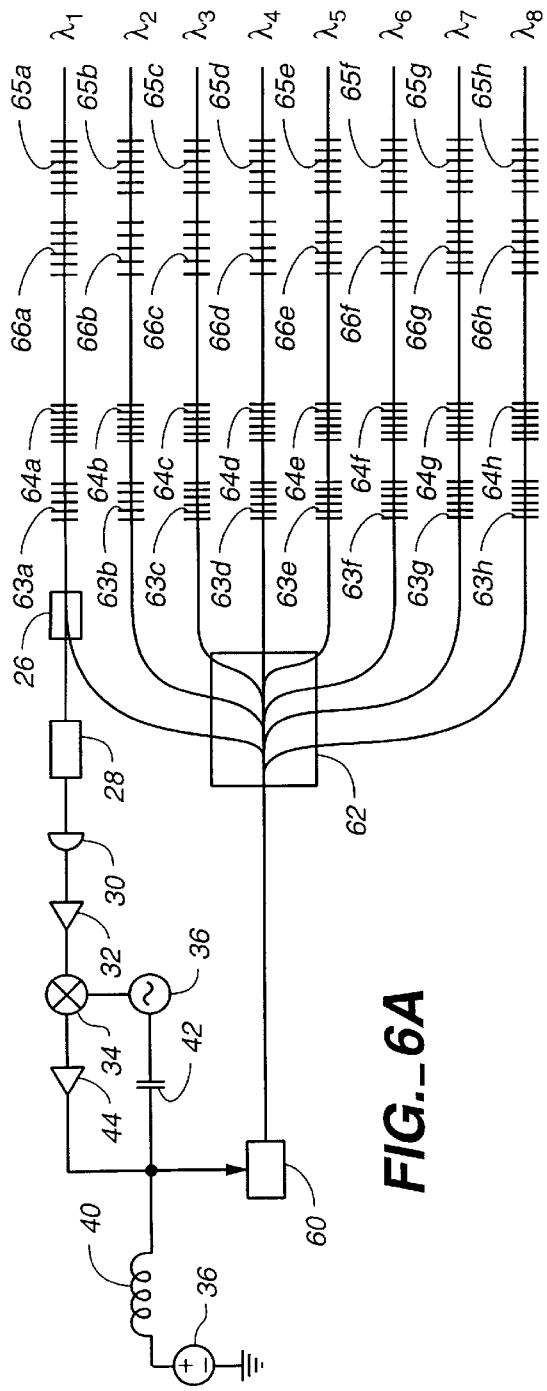
FIG._6A
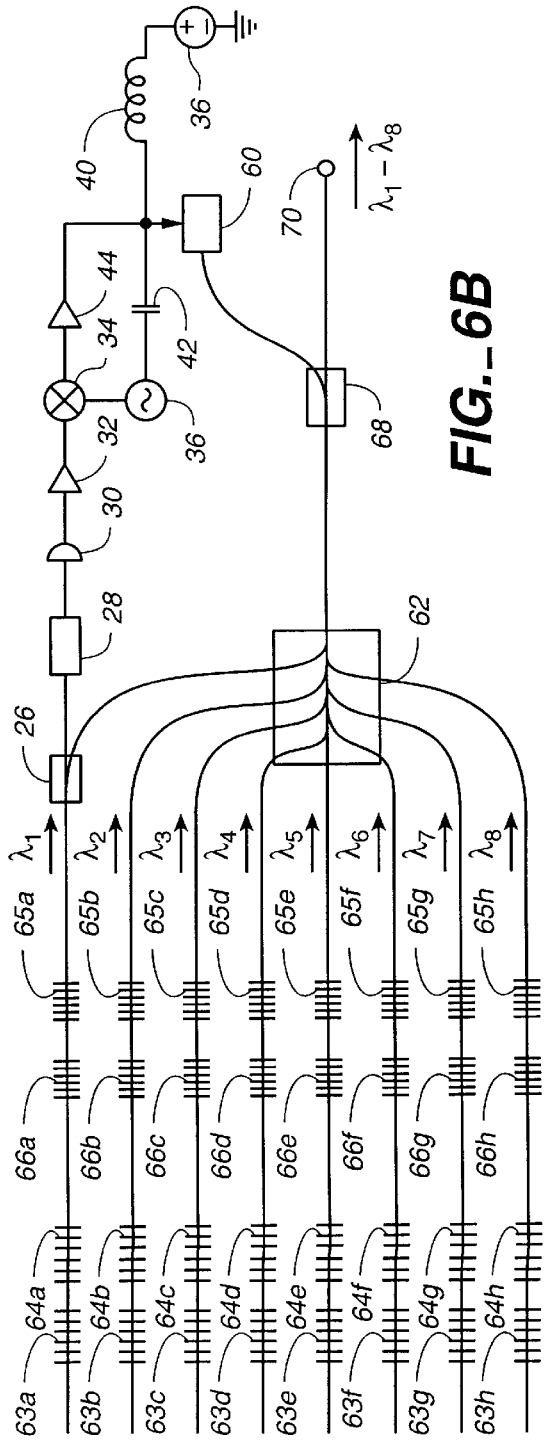
FIG._6B

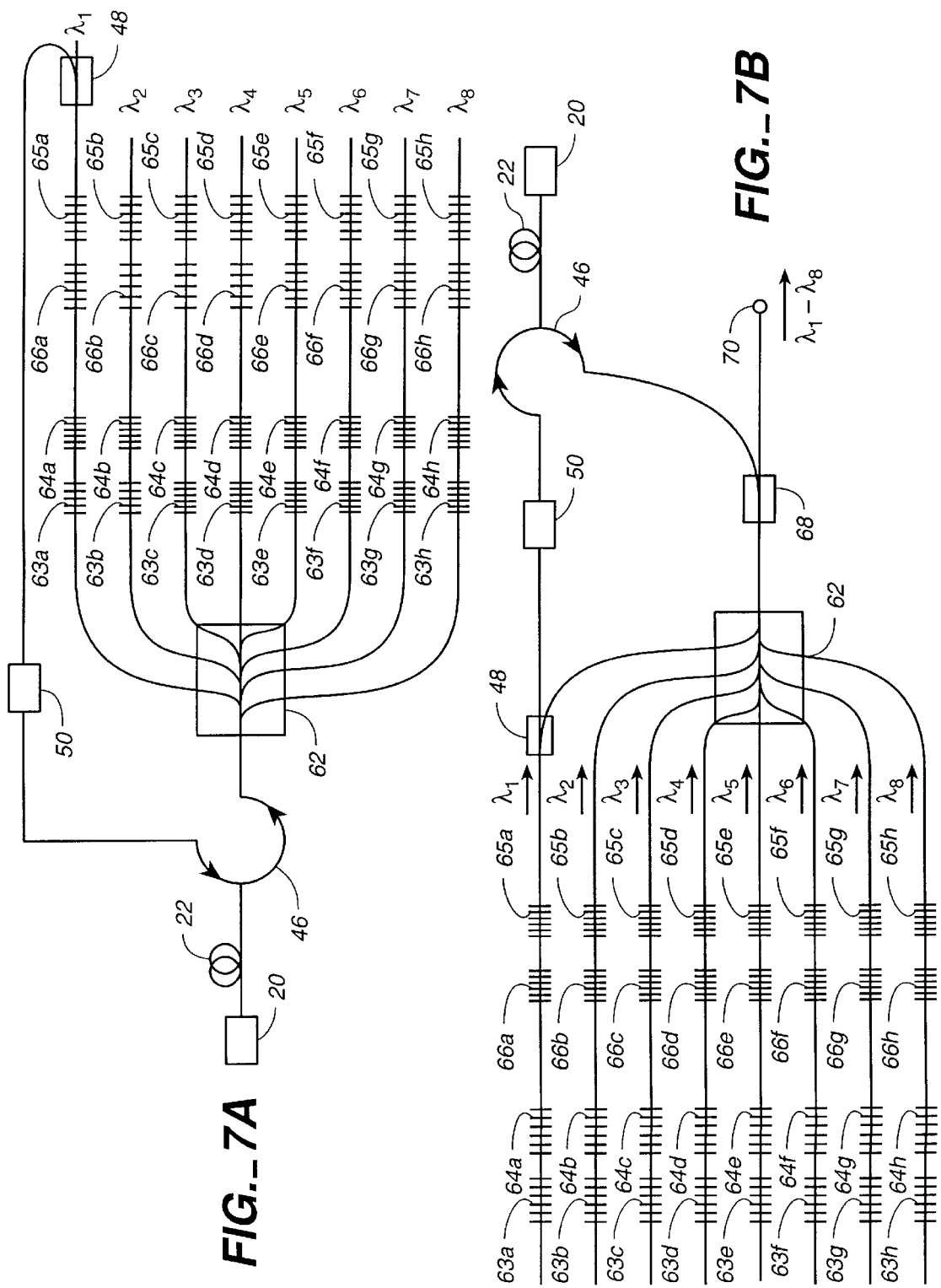

RESONANT PUMPED SHORT CAVITY FIBER LASER

CROSS REFERENCE TO RELATED APPLICATIONS

This is a divisional of U.S. patent application Ser. No. 08/970,745, filed Nov. 14,1997, now U.S. Pat. No. 6,044,070.

FIELD OF THE INVENTION

This invention relates to the field of optical signal processing and, more particularly, to the generation of a low-noise, single frequency laser output.

BACKGROUND OF THE INVENTION

In optical communications, it is desirable to use a communication wavelength in the wavelength range of approximately 1.5 micrometers ($\mu$m). This is because 1.5 $\mu$m is the lowest loss wavelength of conventional single-mode glass fibers. As the number of desired channels and demand for high video quality increases, the corresponding demands on an optical transmission source also increase. Among these is the demand for a low-noise, single-frequency 1.5 $\mu$m laser source. Fiber laser sources have been created which use an erbium (Er) doped optical fiber as a gain medium. However, such fiber lasers typically suffer from a tradeoff between gain and power, and mode discrimination.

It is commonly understood that, within a fiber laser, longitudinal mode spacing is inversely proportional to the length of the laser cavity. That is, for a longer resonator cavity, the frequency spacing between adjacent resonance frequencies is smaller. As a result, more longitudinal modes are within the (necessarily finite) width of the gain spectrum, and mode discrimination is poor. Even if the effective gain spectrum of the fiber laser is narrowed through the use of narrow band reflectors, such as Bragg gratings written directly into the core of the fiber, many modes may exist with that effective gain bandwidth. For the designer of a single-frequency laser, this causes several difficulties. Firstly, the wide spectrum emitted from the laser interferes with other laser sources transmitted at different wavelengths in wavelength division multiplexed systems. Secondly, dispersion in the wide spectrum results in pulse spreading. Finally, mode competition between longitudinal modes causes amplitude instability.

By making the laser cavity shorter, the mode spacing is increased and, if the cavity is short enough, the gain spectrum may be limited to a single resonance frequency. However, the length of the gain medium (i.e. the doped fiber surrounding the cavity) also affects the optical gain of the laser. With a relatively short length of fiber, the gain of the laser is low since there is less distance across which the pump energy may be absorbed within the fiber.

It would be desirable to have an optical source that has an output power significantly higher than previously available, and which has the mode discrimination benefits of a short fiber gain medium.

SUMMARY OF THE INVENTION

The present invention provides a single-frequency laser source in which a high output power is achieved by developing a resonant condition for the pump energy wavelengths within the laser cavity. In general, the laser source has an optical fiber gain medium and a signal reflection apparatus that reflects light at the signal wavelength within the gain medium, so as to establish a resonance condition at the signal wavelength. The signal reflection apparatus is substantially entirely reflective when it comes to optical energy in the cavity traveling toward an input side of the cavity, and partially reflective to optical energy in the cavity traveling toward an output side of the cavity. This partial reflectivity provides the desired output coupling for the laser. The gain medium is pumped by a pump source that couples light at an appropriate pumping wavelength into the laser cavity. Once coupled into the laser cavity, the pump energy is retained within the cavity using a pump resonator that reflects light back and forth within a resonant cavity that includes the gain medium. This maximizes the pumping efficiency, particularly for the short fiber laser, by retaining the pump energy within the gain medium.

The signal reflection apparatus may take different forms, as may the pump resonator. For example, the signal reflection apparatus may have a distributed feedback (DFB) type configuration in which a periodic grating is built into a pumped part of the gain medium. As known in the art, a DFB grating has a shift in its structure that results in a ¼-wavelength phase shift in light at the chosen wavelength (e.g., the signal wavelength), thus giving the desired resonance condition. Alternatively, the signal reflection apparatus may also have a distributed Bragg reflector (DBR) type configuration, in which an input periodic grating is located relatively close to an input side of the gain medium and an output periodic grating is located relatively close to an output side of the gain medium. The input grating is highly reflective to keep the optical energy at the signal wavelength within the cavity, while the output grating is partially reflective to allow output coupling of the laser energy.

The configuration described above for the signal reflection apparatus may be combined with different configurations for the pump resonator. The pump resonator may be a DFB type structure that is reflective at the pump wavelength and that is built into a part of the gain medium occupied by a DFB type signal reflection apparatus grating. The pump resonator may also be a DBR type structure having two highly reflective periodic gratings, one on either side of the signal reflection apparatus, that reflect optical energy at the pump wavelength back and forth within the gain medium. The DBR type pump resonator may be used with either a DFB type or a DBR type signal reflection apparatus. In either circumstance, the gratings of the pump resonator surround the grating or gratings of the signal reflection apparatus, and provide "resonant pumping" of the gain medium across the area occupied by the signal reflection apparatus. Also, when a DBR type signal reflection apparatus is used with a DBR type pump resonator, a Q-switch may also be used to generate a high-intensity, short-duration pulse.

In one variation of the invention, a DBR-type arrangement of pump gratings may be used to construct a short fiber amplifier similar to the short fiber lasers discussed above. However, rather than using a signal reflection apparatus which develops the desired signal wavelength such that it originates in the gain medium, only the pump resonator is used. The signal to be amplified is then introduced into the pumped gain medium, where it is amplified before being output. The resonant pumping of the gain medium maintains a desired level of population inversion, and allows the signal passing through the gain medium to be amplified by stimulated emission. Also, with the use of only a single, broadband signal reflector, an amplified spontaneous emission (ASE) source may be formed that provides a broadband optical output.

In one embodiment of the invention, a plurality of resonant-pumped lasers are arranged in series and allow an optical signal to be generated at any of a plurality of different signal wavelengths. Each of the laser cavities may have a different combination of DFB and DBR type signal reflection apparatus and pump resonator. For each laser, a DFB type signal reflection apparatus may be combined with either a DFB or a DBR type pump resonator, or a DBR type signal reflection apparatus may be combined with a DBR type pump resonator. Each of the lasers in series has a signal reflection apparatus constructed to oscillate at a signal wavelength different than the signal wavelengths of the other lasers. Furthermore, each of the lasers has a pump resonator constructed to oscillate at a pump wavelength different than the pump wavelengths of the other lasers. Thus, when a first pump wavelength is directed into the series arrangement of lasers, it resonates only in a first laser cavity that has its pump resonator constructed to oscillate at the first pump wavelength. This results in the gain medium of the first laser cavity being resonant pumped, while the other laser cavities achieve no such pumping. The pumping of the first laser cavity causes the generation of signal energy within the first cavity, which resonates at a first desired signal wavelength, being reflected within the cavity by the signal reflection apparatus and eventually coupled out of the first laser cavity. When a different pump wavelength is introduced into the series laser arrangement, it oscillates in the pump resonator of a different one of the laser cavities, causing that laser cavity to be resonant pumped, and producing a laser output at a second desired signal wavelength. Thus, the wavelength of the laser output is selectable by selecting the wavelength of the input pump energy.

In one variation of the series laser embodiment described above, a wavelength selective element is used at the output of any of the lasers. The wavelength selective element at the output of a given laser couples light at the signal wavelength of that laser (i.e. the wavelength at which the signal reflection apparatus of that laser is designed to resonate) to a first output port, while directing other wavelengths through to any subsequent lasers of the series arrangement. This avoids any losses associated with the output from a given laser passing through subsequent optical components.

In another embodiment of the invention, the pump wavelength is stabilized to prevent reduced efficiency in a resonant pumped laser due to wavelength drift of the pump source. A first variation of this embodiment uses pump light that has a time-varying wavelength due to modulation of a electrical input signal to the optical signal generator, creating two small frequency modulation (FM) side band frequencies. Light reflected from the laser cavity is then used to generate a feedback. The reflected light has an intensity which is minimum (and the transmitted light a maximum) when the light directed to the cavity has a wavelength that satisfies the peak resonant condition of the cavity. When this peak resonance condition is satisfied, a relative time-varying intensity phase between the reflected optical energy and the pump source optical energy is also a minimum. However, when the wavelength of the pump source drifts away from the wavelength for which the pump resonator of the laser achieves peak resonance, a phase shift develops between the two FM sidebands resulting in an FM-to-amplitude modulation (AM) conversion. The relative strength of this AM signal is a measure of how far the pump laser is from its resonance condition. Therefore, this signal may be used to control the wavelength of the pump laser.

The reflected pump energy is coupled to a photodetector that converts it to an electrical feedback signal having a magnitude proportional to the intensity of the reflected optical signal. To control the wavelength of the pump laser, this electrical signal may then, for example, be input to an electrical mixer that combines it with an AC component of the electrical input signal that drives the optical signal generator. The mixing of these two AC signals results in DC offset signal that is combined with the electrical input signal to increase or reduce the driving current to the optical signal generator, and thereby adjust its wavelength to maintain resonance. If the pump signal has drifted to a longer wavelength, the phase shift between the reflected optical signal and the pump source optical signal causes the DC offset to increase the driving current of the optical signal generator and therefore shorten the pump signal wavelength. Conversely, if the pump signal has drifted to a shorter wavelength, the phase shift between the reflected optical signal and the pump source signal causes the DC offset to decrease the driving current of the optical signal generator, thereby lengthening the pump signal wavelength.

Preferably, the current driven component of the optical signal generator is a semiconductor diode which is supplied with a DC current component from a DC electrical power source and an AC current from an AC signal source. Optionally, an optical filter may be used to block wavelengths in the reflected optical energy which are outside the desired wavelength range. Also, the optical signal from the optical signal generator may be passed through an optical isolator prior to its reaching the laser cavity, to avoid reflected signals from returning directly to the signal generator.

In another wavelength-stabilized variation of the invention, the pump wavelength is stabilized using optical feedback from the laser cavity. The optical pump signal is transmitted to the laser cavity via an optical circulator which receives the optical signal from a signal generator along a first optical path. While the majority of the optical pump energy is contained within the laser cavity by the pump resonator, a small amount of this optical energy is also transmitted past the laser cavity. The amount of optical energy transmitted past the cavity is maximum when the wavelength of the light from the pump signal generator satisfies the peak resonance condition of the pump apparatus (i.e. exactly matches the wavelength for which the grating or gratings of the pump resonator were designed). The transmitted optical energy is coupled back to the optical circulator, which directs it to the first optical path in a propagation direction opposite to the propagation direction of the signal from the signal generator. Thus, the transmitted optical signal is returned to the signal generator as an optical feedback signal. The signal generator locks onto the frequency of the feedback signal, and resonates at the frequency of the feedback signal. Thus, satisfying the peak resonant condition of the laser cavity provides the strongest feedback signal, and the strongest lock on the wavelength of the pump signal output by the optical signal generator.

The optical signal generator of the optical feedback embodiment is preferably a fiber laser that includes a doped optical fiber pumped with a semiconductor laser diode. Coupling of the transmitted optical energy back to the optical circulator is preferably accomplished using a wavelength selective optical coupler, such as a wavelength division multiplexer (WDM). The WDM couples only wavelengths in the range of the pump wavelength to be directed back to the optical circulator, while other wavelengths (such as the signal wavelength) are directed to a signal output port. An optical filter may also be used between the directional coupler and the optical circulator which blocks optical energy outside of the wavelength range of the pump wavelength. Optionally, the magnitude of the transmitted optical energy may also be attenuated with an optical attenuator in an optical path between the directional coupler and circulator.

In another variation of the invention, multiple laser cavities can be pumped using a single pumping source. The laser cavities may be constructed to each have a different output signal wavelength and a predetermined distribution of output powers. In the preferred embodiment, the output powers of all the different lasers are equal. The lasers are all fed from a single pump source using a multiple branch optical coupler. The optical coupler may be a fused fiber optical coupler, and receives the optical pump energy from the pump source, distributing it to each of the laser cavities. Each of the laser resonators has a gain medium which may be pumped by the optical energy at the wavelength of the energy from the pump source. However, each resonates at a different signal wavelength. Thus, each of the lasers gets an equal distribution of pump power, but outputs a different wavelength. In one embodiment the lasers are resonant pumped using pump gratings on each which retain the pump energy within the gain medium. Furthermore, the stability of the pumping source may be stabilized using either electronic or optical feedback.

In a construction similar to that described above, a multiple branch directional coupler may also be used to couple a plurality of different laser outputs, each having a different wavelength, into a signal optical waveguide. The laser cavities are each located in a different gain medium, each of which is coupled into a single waveguide by the directional coupler. The coupler may be a fused fiber coupler, and pump energy from a single pump source is coupled into the laser cavities from the single waveguide through the directional coupler. The pump source may be a semiconductor laser diode. A wavelength selective coupler (preferably a WDM) is used to direct optical energy from the pump source into the waveguide, while preventing energy outside the wavelength range of the pump wavelength from reaching the pump source. In one embodiment the lasers are resonant pumped using pump gratings on each which retain the pump energy within the gain medium. Furthermore, the stability of the pumping source may be stabilized using either electronic or optical feedback.

BRIEF DESCRIPTION OF THE DRAWINGS

FIG. 1A is a schematic view of a resonant pumped fiber laser according to the present invention that uses a signal energy reflector and a pump energy reflector each of which are of a distributed feedback (DFB) type construction.

FIG. 1B is a schematic view of a resonant pumped fiber laser according to the present invention that uses a signal energy reflector having a DFB type construction and a pump energy reflector having a distributed Bragg reflector (DBR) type construction.

FIG. 1C is a schematic view of a resonant pumped fiber laser according to the present invention that uses a signal energy reflector and a pump energy reflector each of which has a DBR construction.

FIG. 1D is a schematic view of a resonant pumped fiber laser similar to that show in FIG. 1C, but is Q-switched.

FIG. 1E is a schematic view of a resonant pumped fiber amplifier according to the present invention.

FIG. 1F is a schematic view of a resonant pumped amplified spontaneous emission source according to the present invention.

FIG. 2A is a schematic view of a resonant pumped laser apparatus according to the present invention with a selectable output wavelength, the apparatus having two resonant cavities in series, each of which has a construction as shown in FIG. 1A.

FIG. 2B is a schematic view of a resonant pumped laser apparatus according to the present invention with a selectable output wavelength, the apparatus having two resonant cavities in series, each of which has a construction as shown in FIG. 1B.

FIG. 2C is a schematic view of a resonant pumped laser apparatus according to the present invention with a selectable output wavelength, the apparatus having two resonant cavities in series, each of which has a construction as shown in FIG. 1C.

FIG. 3A is a schematic view of a resonant pumped laser similar to that shown in FIG. 2B, but which also includes a wavelength selective output coupler for resonant cavities of the laser to allow low-loss output coupling of the laser outputs.

FIG. 3B is a schematic view of a resonant pumped laser similar to that shown in FIG. 2C, but which also includes a wavelength selective output coupler for resonant cavities of the laser to allow low-loss output coupling of the laser outputs.

FIG. 4A is a schematic view of a resonant pumped laser that uses electrical feedback to stabilize the wavelength output of the optical pumping source.

FIG. 4B is a schematic view of a resonant pumped laser that uses optical feedback to stabilize the wavelength output of the optical pumping source.

FIG. 5A is a schematic view of a multiple output laser that has multiple laser resonators pumped by a single optical pumping source.

FIG. 5B is a schematic view of a laser source which has multiple laser resonators pumped by a single optical pumping source, and which combines the discrete wavelength outputs of the different resonators on a single optical waveguide.

FIG. 6A is a schematic view of a multiple output laser that has multiple laser resonators that are resonant pumped and use a single optical pumping source that is wavelength stabilized using electronic feedback.

FIG. 6B is a schematic view of a laser source having an output which is a combination of a number of discrete wavelengths, the laser source having multiple laser resonators that are resonant pumped and use a single optical pumping source that is wavelength stabilized using electronic feedback.

FIG. 7A is a schematic view of a multiple output laser that has multiple laser resonators that are resonant pumped and use a single optical pumping source that is wavelength stabilized using optical feedback.

FIG. 7B is a schematic view of a laser source having an output which is a combination of a number of discrete wavelengths, the laser source having multiple laser resonators that are resonant pumped and use a single optical pumping source that is wavelength stabilized using optical feedback.

DETAILED DESCRIPTION OF THE PREFERRED EMBODIMENTS

Shown in FIG. 1A is a schematic depiction of a short fiber laser 11 consisting of doped optical fiber 10 in which are etched two gratings. The gratings consist of a first grating (the "signal" grating) 12 and a second grating (the "pump" grating) 14. Each of the gratings is a wavelength-selective reflector etched into the cladding layer of the fiber 10, and each therefore reflects light at a predetermined wavelength. The arrangement of FIG. 1A is similar to a "distributed feedback" (DFB) laser structure, which is known in the art. In a DFB laser, a periodic grating is built right into a pumped part of the gain region. The grating is a periodic variation of refractive index along the gain medium that causes reflection at a desired signal wavelength. As is know in the art, the periodic variation includes a shift at roughly its center, which results in a phase shift of one quarter of the predetermined wavelength. Thus, the structure of FIG. 1A uses a "λ/4-shifted" grating structure, as is common in DFB lasers. This allows positive feedback of the optical energy at the signal wavelength, such that the desired resonance condition is achieved. Unlike the traditional DFB laser, however, the FIG. 1A embodiment uses not only signal grating 12, which is reflective at the signal wavelength, but also pump grating 14, which is reflective at the wavelength of the optical energy from optical pumping source 15, which is used to pump the optical fiber.

In the embodiment of FIG. 1A, both of the gratings 12, 14 extend along the gain portion of the fiber 10, occupying the same longitudinal section of fiber. The pump grating 14 has a DFB-type structure like that of the signal grating 12, but it is constructed to be reflective at the pump energy wavelength. The result of this positioning of the two gratings is that, within the gain portion of the fiber, the gratings provide a resonant condition for both the signal energy and the pump energy. The signal wavelength $\lambda_s$, is reflected within the gain region by the signal grating 12, while the pump wavelength $\lambda_p$ is reflected within the gain region by the pump grating 14. The reflection of $\lambda_s$ provides the desired resonance condition, as in a conventional fiber laser. The reflection of $\lambda_p$, meanwhile, contains the pump energy within the gain portion of the optical fiber 10, where it may be absorbed by the doped fiber material, allowing the stimulated emission of optical energy at the signal wavelength $\lambda_s$. This "resonant pumping" of the short fiber laser allows it to develop higher signal powers than conventional short fiber lasers in which the pump energy simply passes once through the gain medium.

The embodiment of FIG. 1B is also a resonant pumped short fiber laser 11, but rather than using a pump grating that extends the length of the gain medium, two pump gratings 14 are used, one on either side of the laser cavity. The cavity is defined by the location of signal grating 12, which is essentially the same as the signal grating 12 of FIG. 1A. The gratings 14 cause pump energy to be reflected back and forth through the doped fiber in the region containing the signal grating 12, such that the pump energy is absorbed, and spontaneous emission of optical energy at the signal wavelength $\lambda_s$ results. This arrangement of the pump gratings is similar to that of a distributed Bragg reflector (DBR) laser in that the pump gratings are positioned to either side of the active region of the laser.

Shown in FIG. 1C is another embodiment of the short fiber laser 11. This embodiment is again similar to a DBR laser in that the signal gratings 12 are both positioned outside of the active region of the laser. As in the FIG. 1B embodiment, the pump gratings 14 are also outside of the active region, and the resulting structure provides resonance within the laser cavity at both the signal wavelength $\lambda_s$, and at the pump wavelength $\lambda_p$. The optical signal energy and the pumping energy is reflected back and forth within the cavity, each between its respective set of wavelength-selective gratings. The erbium-doped fiber 10 absorbs the optical energy at the pump wavelength $\lambda_p$, and spontaneous emission of optical energy at the signal wavelength $\lambda_s$ results in generation and amplification of the optical signal, which resonates within the cavity established by the signal gratings. Thus, wherein the FIG. 1B embodiment uses a DFB type signal reflection apparatus with a DBR type pump resonator, the FIG. 1C embodiment uses a DBR type signal reflection apparatus with a DBR type pump resonator.

FIG. 1D is yet another embodiment of a resonant-pumped short fiber laser according to the present invention. The FIG. 1D embodiment is very similar to that of FIG. 1C, using a DBR type signal reflection apparatus 12 with a DBR type pump resonator 14. Unlike FIG. 1C, however, the embodiment of FIG. 1D also includes a Q-switch 13. The concept of Q-switching is well-known in the art, and involves inhibiting oscillation within the resonator cavity until a significant population inversion has developed, at which time the obstacle to feedback is removed and the laser quickly develops a high degree of oscillation and a high power, short duration ("giant") pulse is emitted. The Q-switch 13 of FIG. 1D may be any of a number of known types of Q-switch, and is positioned between the signal gratings 12. In this embodiment, if a 1550 nm signal wavelength is used, and the fiber is erbium-doped, it is preferred that the pump wavelength be 1480 nm, that is, the gratings 14 in FIG. 1D are constructed to have a peak resonant condition at approximately 1480 nm. This is because under the Q-switched process, the fiber is very strongly pumped and, under these conditions, the use of a 980 nm pump wavelength would result in severe losses due to a two photon upconversion process (excited state absorption—ESA).

In FIG. 1E is shown a short fiber amplifier structure similar to that of the short fiber lasers shown in FIGS. 1A–1D. Unlike the fiber laser embodiments, the signal wavelength is not generated within the gain medium, but is coupled together with the pump wavelength using an optical coupler such as WDM 17. Pump resonator, established by gratings 14, keeps the pump energy oscillating within the gain medium, where it can be absorbed by the doped fiber. This resonant pumping maintains a population inversion in the amplifier gain medium. Thus, the signal energy is amplified through stimulated emission from the pumped fiber.

FIG. 1F depicts an embodiment of the present invention in which resonant pumping is used to provide population inversion in an amplified spontaneous emission (ASE) source. Like the above embodiments, the ASE source uses doped optical fiber 10 and a pump resonator consisting of gratings 14. Optical pumping source provides the pump energy which resonates between the gratings 14, being absorbed by the optical fiber. However, rather than providing a single wavelength signal resonance cavity, as in the fiber laser embodiments, the pumped fiber 10 is simply allowed to generate a broadband output. A broadband grating 21 is located between the pump source 15 and the fiber gratings 14 to ensure that the ASE output (indicated in the figure by the symbol $\lambda_{ASE}$ is directed in the direction away from the pump source 15.

In each of the embodiments of FIGS. 1A, 1B 1C and 1D, the wavelengths used are selected based on the desired signal output and the doping material used for the fiber 10. For example, a preferred embodiment may be designed for an optical signal at a wavelength of $\lambda_s$=1550 nm, which is near the transmission peak of conventional silica-based optical fiber. In such a case, an erbium-doped optical fiber may be used, and may be pumped with optical energy at a wavelength of, e.g., Ap 980 nm. Similarly, an erbium/ytterbium doped fiber could be used, and could be pumped with optical energy at a wavelength of, e.g. $\lambda_p$_1060 nm.

Referring to FIGS. 2A–2C, a tunable embodiment of the invention is shown in which two short fiber lasers are arranged in series. In FIG. 2A, two lasers each having the construction of the laser of FIG. 1A are formed by different gratings etched into doped optical fiber 10. Fiber laser 11a is constructed in the fiber from signal grating 12a and pump grating 14a, while fiber laser 11b is constructed from signal grating 12b and pump grating 14b. The signal gratings 12a, 12b are both wavelength-selective, each being reflective at a different wavelength within the gain profile of the doped optical fiber. For example, if fiber 10 is doped with erbium/ytterbium, the signal grating 12a may be constructed to be highly reflective at a wavelength of $\lambda_{s1}$=1552 nm, while grating 12b is constructed to be highly reflective at a wavelength of $\lambda_{s2}$=1550 nm. Likewise, the pump gratings 14a, 14b are also wavelength selective and each reflective at a different wavelength within the acceptable range of pump wavelengths for the fiber. For an erbium/ytterbium doped fiber 10, pump grating 14a may be made highly reflective at a wavelength of $\lambda_{p1}$=1062 nm, while pump grating 14b is highly reflective at a wavelength of $\lambda_{p2}$=1060 nm.

The wavelength discrimination of each signal grating is high enough that optical signal energy at the wavelength of one grating is not significantly affected by the other grating. For example, optical energy at $\lambda_{s1}$, while being reflected by grating 12a, bypasses grating 12b with only a small amount of loss due to interaction between the light and the grating 12b. The same is true for the wavelength discrimination of the pump gratings. That is, optical energy at wavelength $\lambda_{p1}$ suffers only a relatively small amount of loss due to interaction with the pump gratings 14b. This high discrimination of the gratings 12a, 12b, 14a, 14b allows the overall laser device to have a selectable output wavelength.

The input to the laser embodiment of FIG. 2A is a tunable pump energy source 19, which may be tuned to a wavelength of either $\lambda_{p1}$, or $\lambda_{p2}$. When the input pump source is tuned to $\lambda_{p1}$, the pump energy is reflected within the gain medium of short fiber laser 11a by pump grating 14a. This reflection keeps most of the pump energy resonating within the cavity of laser 11a, and allows it to be absorbed by the fiber, which then generates optical energy through stimulated emission. The optical energy output within the cavity includes optical energy at the signal wavelength $\lambda_{s1}$, which is within the range of output wavelengths for doped optical fiber 10. Since signal grating 12a is highly reflective at $\lambda_{s1}$, a resonance condition at this wavelength is established within the cavity of short fiber laser 11a. The grating 12a is selected to allow a certain amount of transmission in the output direction of the laser 11a (i.e. toward the right at the orientation shown in FIG. 2A). Thus, laser energy at wavelength $\lambda_{s1}$, is output from the short fiber laser 11a toward short fiber laser 11b. However, because of the high degree of discrimination of the gratings of both lasers, the desired $\lambda_{s1}$ output passes through the laser 11b with only a small degree of loss due to reflection from grating 12b. Similarly, any $\lambda_{p1}$ pump energy leaking out of the first short fiber laser 11a does not significantly interact with gratings 14b of laser 11b, and pumping of the second laser cavity is therefore minimized.

When an output at wavelength $\lambda_{s2}$ is desired, the wavelength of the input optical energy is set at $\lambda_{p2}$. Because of the high discrimination of the gratings, very little loss of the $\lambda_{p2}$ pump energy occurs as it passes through fiber laser 11a. However, the high reflectivity of gratings 14b result in the $\lambda_{p2}$ pump energy resonating within the gain medium of fiber laser 11b. Absorption of the pump energy results in stimulated emission within the cavity of laser 11b, including emission of optical energy at wavelength $\lambda_{s2}$. This energy is reflected within the cavity of laser 11b due to the high reflectivity of signal grating 12b, and a resonance condition is established. The signal grating 12a is selected to allow partial transmission of the $\lambda_{s2}$ optical energy out of the laser 11b cavity, providing the necessary output coupling of the laser. Thus, the laser output may be selected to be either $\lambda_{s1}$ or $\lambda_{s2}$ by tuning the wavelength of the input pump energy.

The embodiments of FIGS. 2B and 2C function in essentially the same way as the embodiment of FIG. 2A, except for the specific construction of each of the fiber lasers 11a, 11b. In FIG. 2B, short fiber lasers 11a, 11b each have the same construction as the short fiber laser of FIG. 1B, that is, each has a single signal grating (12a and 12b, respectively) which extends the length of the gain medium, and two pump gratings (14a and 14b, respectively) at the ends of the gain medium. For each laser 11a, 11b, the signal grating is partially reflective toward the output side of the laser (i.e. to the right in the orientation of FIG. 2B) to provide the output coupling of each laser. As in the embodiment of FIG. 2A, the wavelength discrimination of the gratings is high enough that there is very little interference with one signal wavelength by the pump grating constructed to reflect the other signal wavelength. Similarly, there is very little interference with one pump wavelength by the pump gratings constructed to reflect the other pump wavelength. By selecting between input pump wavelengths $\lambda_{p1}$, $\lambda_{p2}$, one may select between output signal wavelengths $\lambda_{s1}$, $\lambda_{s2}$.

The embodiment of FIG. 2C also functions in the same manner as the embodiment of FIG. 2A, except that the short fiber lasers 11a, 11b have a construction like that of the laser shown in FIG. 1C (or alternatively use the Q-switched embodiment of FIG. 1D). That is, in each laser 11a, 11b, signal gratings (12a and 12b, respectively) are to either side of the gain medium, as are two pump gratings (14a and 14b, respectively). When input wavelength $\lambda_{p1}$ is selected, the gratings 14a reflect the pump energy back and forth across the gain medium of short fiber laser 11a, allowing the absorption of pump energy and stimulated emission of signal energy. The signal grating 12a to the output side of the laser (i.e. to the right in the orientation of FIG. 2C) has a degree of partial reflectivity which allows some of the signal energy to be coupled out of the laser. When the input wavelength selected is $\lambda_{p2}$, the pump energy substantially bypasses laser 11a, and is reflected between pump gratings 14b of laser 11b, resulting in its absorption and the generation of optical energy at wavelength 42. The signal grating 1 2b to the output side of laser 11b (i.e. to the right in the orientation of FIG. 2C) is partially transmissive to allow output coupling of the $\lambda_{s2}$ laser energy. Thus, as in the embodiments of FIGS. 2A and 2B, selection between input pump wavelengths $\lambda_{p1}$, $\lambda_{p2}$ with source 19 allows one to select between output signal wavelengths $\lambda_{s1}$, $\lambda_{s2}$.

For each of the embodiments of FIGS. 2A–2C, it is preferable that the signal grating(s) of the laser 11a be constructed to reflect longer wavelengths than the signal grating(s) of laser 11b. This is due to the fact that the interference encountered by shorter wavelengths passing through gratings set to reflect higher wavelengths is less than the interference encountered by longer wavelengths passing through gratings arranged to reflect shorter wavelengths. Thus, the series arrangement of short fiber lasers in this manner should always have lasers with gratings constructed to reflect longer wavelengths preceding those with gratings constructed to reflect shorter wavelengths.

It should also be readily apparent to one skilled in the art that the tunable laser configurations of FIGS. 2A–2C should not be considered limited to only two lasers. While only two lasers are shown in each of these figures, additional short fiber lasers with different gratings can be placed in series with lasers 11a, 11b to allow additional tunable output wavelengths. Furthermore, the embodiments of FIGS. 2A–2C incorporate the resonant pumped laser structures shown in FIGS. 1A–1D but, in each embodiment, use the same type of structure for both of the series-linked lasers. Those skilled in the art will recognize that the different laser structures shown in FIGS. 1A–1D can be mixed and matched to arrive at a desired configuration. For example, a series combination of the structure of FIG. 1A and the structure of FIG. 1C could be used.

Depicted in FIGS. 3A and 3B are variations of the wavelength selective embodiments of FIGS. 2B and 2C in which the output signals for each of the lasers 11a, 11b are extracted directly from the lasers themselves using wavelength division multiplexers. The arrangement shown in FIG. 3A is the same as that of FIG. 2B, except that wavelength division multiplexer (WDM) 16a is located between signal grating 12a and the output side pump grating 14a of the laser 11a. The WDM 16a diverts optical energy at a wavelength of $\lambda_{s1}$ to a desired output location. While WDM 16a is only schematically shown in the figure, the general use of WDMs is well-known in the art. By using WDM 16a as the output path for the laser energy of short fiber laser 11a, the $\lambda_{s1}$, laser output does not have to pass through short fiber laser 11b. Thus, any losses due to interaction with the gratings of laser 11b are avoided. Obviously, the pump energy $\lambda_{p1}$, which pumps laser 11a, is not diverted by the WDM 16a as it reflects back and forth through the gain medium of laser 11a. Likewise, pump energy at the wavelength 42 passes through the WDM to pump the fiber laser 11b.

In the fiber laser 11b of FIG. 3A, WDM 16b is used to divert the laser output at wavelength $\lambda_{s2}$ to a desired output location. As in laser 11a, the pump energy is not diverted, and remains within the laser cavity, reflecting between the gratings 14b. Those skilled in the art will recognize that the WDM 16b could be omitted if the system had only the two lasers 11a, 11b, and there would be little difference in the $\lambda_{s2}$ signal loss. However, WDM 16b is included in FIG. 11b since the embodiment may also include additional short fiber lasers having different output wavelengths. If these additional fiber lasers are located to the output side of laser 11b (i.e. to the right of laser 11b relative to the orientation of FIG. 3B), WDM 16b prevents the $\lambda_{s2}$ output signal from having to pass through the signal gratings of the subsequent lasers, where some losses might occur.

The configuration of FIG. 3B is identical to that of FIG. 2C, except that WDMs 16a, 16b are used in the same manner as shown in FIG. 3A. That is, the WDMs 16a, 16b are used in the FIG. 3B embodiment to divert the laser signal energy individually out of each laser to avoid any losses which might occur as it passes through downstream laser components. Again, the WDM 16b is included to allow for the diversion of signal energy at a wavelength of $\lambda_{s2}$ should additional short fiber lasers be used. In each of the embodiments of FIGS. 3A and 3B, the arrangement provided allows for a selectable laser output which is changed by changing the input pump wavelength, as is described above with regard to FIGS. 2A–2C. A further embodiment can also be used which functions in the same manner as the embodiments of FIGS. 3A and 3B, but which uses a laser structure like that of FIG. 1B in one stage, while using a laser structure like that of FIG. 1C in the other stage.

Because the resonant pumping laser systems described herein rely on a high degree of wavelength discrimination for performance, accurate control of the light input to the lasers can be very important. This is particularly true when using light sources that can drift in wavelength. For example, sources such as semiconductor lasers are known to suffer drift of their output wavelength with changes in time and/or temperature.

Shown in FIG. 4A is a fiber laser system which uses electronic feedback to maintain its wavelength stability of the pump source. The source of pumping energy is a single-wavelength semiconductor pump laser consisting of semiconductor diode 20 and doped optical fiber 22 (for ease of description, optical fibers in FIGS. 4A and 4B are each shown schematically as a line). Such pump lasers are well-known in the art, and provide a single wavelength optical output. However, changes in time and temperature may cause the pump laser output to drift slightly in wavelength. Since this laser source is to be used as a pump source for a resonant-pumped short fiber laser having reflectors at the peak pump wavelength, it is important to prevent such drift so that the output of the pump laser remains stable at the desired pump wavelength. To do this, the embodiment of FIG. 4A uses electronic feedback to control the current driving the diode, as described in more detail below. Since changes in the diode driver current cause changes in the output wavelength of the diode, this feedback may be used to combat wavelength drift in the pump laser.

The semiconductor diode 20 is current driven, and has a DC power input provided by DC voltage source. The power input to the diode is also modulated by AC voltage source 36, the amplitude of which is a fraction (e.g. several percent) of the DC voltage from voltage source 36. Inductor 40 and capacitor 42 help prevent any interaction between the two sources 36, 38. Thus, the electrical power to the diode 20 (and therefore the optical power output) is modulated about a particular magnitude at the frequency of the AC voltage source 36. This modulation results in an FM signal with two small side bands in addition to the carrier of the unmodulated pump laser.

The output of doped fiber 22 is coupled into optical isolator 22. The optical isolator 22 is a unidirectional optical element that is known in the art and commercially available. The isolator 22 prevents any optical energy from being fed back to the diode and disrupting its operation. From the isolator 22, the pump energy passes to optical coupler 26. Optical coupler 26 is some type of beamsplitter, such as a wavelength division multiplexer. It passes most of the optical energy through to short fiber laser 11, which consists of signal gratings 12 and pump gratings 14. The fiber laser 11 shown in FIG. 4A is the same construction as that of FIG. 1C. However, the electronic feedback arrangement shown may be as easily used with the resonant pumped laser arrangements shown in FIGS. 1A and 1B.

The optical energy provided by the semiconductor pump laser is reflected between pump gratings 14 as described in previous embodiments. This resonance keeps the pump energy in the gain medium where it is absorbed by the fiber, which then outputs optical energy at the desired signal wavelength by stimulated emission. The combination of gratings 12, 14 to the input side of the fiber laser 11 also reflects a small amount (e.g. 5%) of the pump energy reaching it. When the pump energy input to the fiber laser 11 is at the correct wavelength, the peak resonant condition for the gratings is achieved. However, if the input energy is "off resonance" (i.e. the wavelength is different from that for which the gratings 14 are constructed), the optical energy reflected back toward optical coupler 26 will have an increased intensity. In addition to the increase in reflectivity, a non-resonant condition will result in a different phase shift for the two side bands of the FM signal. This phase shift, in turn, results in an FM-to-AM conversion. The magnitude of the AM signal is a measure of how far the pump laser is off-resonance. This may then be used to provide the desired feedback control of the diode 20.

After reflection from the input pump grating 14 of laser 11, this reflected pump energy returns to the directional coupler, and a portion of it is directed to filter/attenuator 28. Filter/attenuator 28 is an optional component which may be used to block wavelengths outside of the desired range of the pump wavelength. This minimizes the relative noise in the reflected pump energy. Filter/attenuator 28 may also simply reduce the magnitude of the feedback signal to a desirable level. After exiting the filter/attenuator 28, the reflected pump energy is input to photodetector 30, which converts the optical energy into an electrical feedback signal.

The electrical feedback signal has the characteristics of the reflected optical signal, including any intensity change and phase shift. This signal is amplified by linear amplifier 32, and is input to mixer 34. Mixer 34 is an electronic frequency mixer, as is know in the art, and combines the amplified feedback signal with the AC signal from AC voltage source 36. Because the frequencies of the signals are identical or nearly identical, the output from mixer 34 is a DC voltage. This voltage is amplified using amplifier 44. The magnitude of the DC voltage is affected by the relative phase of the feedback signal and the AC input signal. This phase difference is, in turn, affected by the difference between the resonant wavelength of the pump gratings 14 (i.e., the wavelength at which a peak resonance condition is achieved by the gratings 14) and the wavelength of the optical energy from the diode. If the output wavelength of the diode drifts shorter, the relative phase shift will cause the DC signal output from mixer 34 to decrease in magnitude. This, in turn, causes the wavelength output from the diode to increase, moving it back toward the peak resonance condition of the gratings 14. Similarly, if the output wavelength of the diode becomes longer, the DC signal output from mixer 34 increases in magnitude. This causes the wavelength of the diode optical output to decrease, again moving it toward the peak resonance condition of the gratings 14.

FIG. 4B shows another feedback arrangement for use with the resonant pumped short fiber lasers disclosed herein. However, rather than using electronic feedback, as in the embodiment of FIG. 4A, the FIG. 4B embodiment uses optical feedback. The optical source of pumping energy is again a fiber laser consisting of semiconductor laser diode 20 and doped fiber coil 22. The pumping energy is input to optical circulator 46. Optical circulator 46 is a device which is known in the art and which is commercially available. The optical circulator is a unidirectional optical element which may have multiple inputs and outputs. The pump energy from fiber coil 22 is input to the circulator, but is output only at the input to short fiber laser 11. Since the circulator 46 is unidirectional, no optical transmission can pass back through the circulator from laser 11 to fiber coil 22. Similarly, any optical energy which is output by filter/attenuator 50 (discussed further below) is directed only to the coil 22, with no optical energy being allowed to go the opposite direction.

The optical pump energy exiting circulator 46 is introduced to the fiber laser 11, and is reflected between the pump gratings 14, allowing it to be absorbed by the doped fiber of the laser. Again, the fiber laser 11 is the same construction as the laser shown in FIG. 1C but, for the purposes of this feedback embodiment, could just as well be either of the embodiments shown in FIGS. 1A and 1B. For pump energy which is "on resonance" (i.e. which is at the peak reflective wavelength of the gratings 14) there is virtually no loss of optical pump energy entering the fiber laser. However, the further off resonance the wavelength of the input pump energy drifts, the more of it gets reflected back toward the circulator. This, in turn, reduces the amount of pump energy entering the fiber laser cavity.

The pump grating 14 toward the output side of the laser 11 (i.e. toward the right in the orientation of FIG. 4B) allows a small fraction of "on-resonance" pump energy to be transmitted past it. This pump energy, along with the signal energy coupled past the partially transmissive output signal grating 12, is directed to optical coupler 48. Optical coupler 48 is preferably a wavelength division multiplexer, and directs optical energy in the wavelength range of the pump energy toward filter/attenuator 50, while directing energy in the wavelength range of the laser 11 signal output, $\lambda_s$, toward an output port of the laser. The pump energy reaching filter/attenuator 50 may be bandpass filtered to eliminate excess noise in the returning pump signal, or may be attenuated to prevent a feedback signal of too high a magnitude. The filter/attenuator 50 is a device known in the art, and is optional depending on the specific design specifications of the system.

The pump energy output from the wavelength division multiplexer 48 constitutes an optical feedback signal, and is used to control the output of the fiber laser source consisting of diode 20 and doped optical fiber 22. After passing through the filter/attenuator 50, the feedback signal passes through circulator 46 toward the source laser. The interaction of the feedback signal with the laser causes it to resonate at the wavelength of the feedback signal. That is, the laser "locks on" to the wavelength of the feedback signal. Since the wavelength of the feedback signal is the "on-resonance" wavelength of the pump gratings 14 of short fiber laser 11, this forces the output from source laser 20, 22 to match the peak resonance wavelength of the pump gratings 14, and thus prevents the wavelength drift of the pump source.

Shown in FIG. 5A is an arrangement for pumping a plurality of short fiber lasers simultaneously. An optical pumping source, such as semiconductor laser diode 60, provides optical energy at a desired wavelength. For a fiber medium doped with erbium, laser source 60, which may be a semiconductor laser diode, would typically have a wavelength of approximately 980 nm. The output of diode 60 is input to an optical splitter 62. Splitter 62 is an optical element of known design, such as a fused fiber directional coupler, that divides the input signal from diode 60 into a plurality of outputs, each of the outputs receiving the same optical power. That is, the splitter provides a equal division of the input signal optical power to each of its multiple outputs.

Each outputs of splitter 62 is directed to one of a number of short fiber lasers. Each fiber laser includes a highly reflective grating 64a–64h (generally referred to as 64) and a partially reflective grating 66a–66h (generally referred to as 66) that serves as the laser output coupler. In the preferred embodiment, the gratings 64, 66 of each of the fiber lasers are constructed to resonate at a different wavelength than that of the other lasers. In this way, the arrangement provides a plurality of different output signals (eight in the embodiment shown), each of which has a different wavelength (the different output wavelengths are indicated in FIG. 5A as $\lambda_1$–$\lambda_8$). Furthermore, each of the laser signals has the same output power as the others, thereby providing a user with a good set of optical signals for multiplexed communications applications.

In FIG. 5B is depicted an embodiment in which the outputs from a plurality of short fiber lasers are all coupled into a single fiber. As in FIG. 5A, the embodiment of FIG. 5B uses a plurality of short fiber lasers, each of which resonates at a different wavelength (in the figure, the different wavelengths are indicated as $\lambda_1$–$\lambda_8$). However, in the embodiment of FIG. 5B, the partially reflective gratings 66a–66h, which function as the laser output couplers, are to the side of the laser facing optical splitter 62, while the highly reflective gratings 64a–64h are to the side of the laser away from splitter 62. The lasers are pumped by an optical source, such as semiconductor laser diode 60, which is coupled into the system output fiber via WDM 68. The optical power of the pumping signal is split between the different fiber lasers by splitter 62, such that the pumping power to each of the lasers is approximately equal. As the different fiber lasers resonate at their different respective wavelengths, the output coupling gratings 66 of the lasers direct the laser outputs back through the splitter 62 and into the output fiber. The wavelengths output from the lasers are significantly different than the pumping wavelength and are directed together by WDM 68 to output port 70.

The feedback arrangements of FIGS. 4A and 4B may also be applied to the multiple short fiber laser embodiments of FIGS. 5A and 5B. Multiple laser embodiments using electronic feedback are shown in FIGS. 6A and 6B, FIG. 6A being essentially a combination of the embodiments of FIG. 4A and FIG. 5A, while FIG. 6A is essentially a combination of the embodiments of FIG. 4A and FIG. 5B. In each of the FIG. 6A and FIG. 6B embodiments, it is only necessary to return optical feedback energy from one of the short fiber laser branches, since the resonator modes of the different lasers are close in wavelength. Preferably, the laser from which optical energy is fed back is one in the middle of the wavelength range of the different lasers.

In each of FIGS. 6A and 6B, reference numerals are used which match those of earlier figure. In each of these figures, the lasers are also resonant pumped, having pump reflector gratings 63a–63h and 65–65h in addition to signal reflector gratings 64a–64h and 66a–66h. In FIG. 6A, the output wavelength of pumping source 60 is controlled using electronic feedback in the same manner as described above with regard to FIG. 4A. The optical reflection signal is taken from the fiber laser having gratings 63a, 64a, 65a, 66a. This arrangement of lasers is then adequately pumped to produce the desired multiple outputs $\lambda_1$–$\lambda_8$. In FIG. 6B, the same type of electronic feedback control is used, and the optical feedback signal is again taken from the laser resonator defined by gratings 63a, 64a, 65a, 66a. This allows stable pumping in the desired range, and provides the desired combined output of wavelengths $\lambda_1$–$\lambda_8$. The embodiments of FIGS. 7A and 7B are similar to those of FIGS. 6A and 6B, except that they use an optical feedback arrangement like that shown in FIG. 4B, rather than the electronic feedback version. The reference numerals in FIGS. 7A and 7B match those of earlier figures, where appropriate. As in the embodiments of FIGS. 6A and 6B, the embodiments of FIGS. 7A and 7B use resonant pumping with pump gratings 63a–63h and 65a–65h. In FIG. 7A, some of the output from the laser defined by gratings 63a, 64a, 65a, 66a is returned to the fiber laser source via WDM 48, aftenuator 50 and optical circulator 46. This stabilizes the output wavelength of the optical source, so that all of the lasers are adequately pumped, and produce the desired multiple outputs having wavelengths $\lambda_1$–$\lambda_8$, respectively. In FIG. 7B, part of the output from the laser defined by gratings 63a, 64a, 65a, 66a is returned to the source via WDM 48, attenuator 50 and optical circulator 46 and stabilizes the output wavelength of the source. This allows the pumping wavelength to be sufficient for all of the lasers, the outputs of which are combined to create the output at port 70 consisting of wavelengths $\lambda_1$–$\lambda_8$.

While the invention has been shown and described with regard to a preferred embodiment thereof, it will be recognized by those skilled in the art that various changes in form and detail may be made herein without departing from the spirit and scope of the invention as defined by the appended claims. For example, while the concepts above have been discussed in the context of optical fiber waveguides, they may be easily extended to waveguide resonators in other media including, but not limited to, planar silica-based ($SiO_2$) waveguides that are formed on silicon substrates, or lithium niobate ($LiNbO_3$) passive or active waveguides formed on $LiNbO_3$ substrates.

What is claimed is:

1. A wavelength-stabilized optical source for generating a wavelength-stable optical signal, the source comprising:

an optical generator generating optical source energy having a timevarying intensity and directing it in a first direction along an optical path;

a resonant pumping cavity toward which the optical source energy is directed and which resonates optical pumping energy through an optical gain medium while reflecting a portion of the source energy along the optical path in a direction opposite the first direction such that the reflected optical energy interacts with the source energy, the reflection being such that a phase shift between the time-varying intensity of the optical source energy and a time-varying intensity of the reflected optical energy is minimized when the source energy has a particular primary wavelength;

a detector that detects optical energy that has been reflected by the resonant cavity and has interacted with the source energy, and converts it to a feedback signal indicative of said phase shift; and a feedback apparatus that provides an input signal to the optical generator in response to the feedback signal, the input signal causing the output wavelength of the optical generator to be adjusted toward the particular wavelength.

2. An optical source according to claim 1 further comprising a DC source and an AC signal source that both contribute to the input signal.

3. An optical source according to claim 2 wherein the feedback apparatus comprises a mixer that combines the feedback signal and a signal from the AC signal source to generate a DC offset signal that contributes to the input signal.

4. An optical source according to claim 3 wherein, when said phase shift has a non-zero value in a first phase direction, the DC offset signal has a negative value, thereby decreasing the total DC signal input to the optical generator, and when said phase shift has a non-zero value in a second phase direction, the DC offset signal has a positive value, thereby increasing the total DC signal input to the optical generator.

5. An optical source according to claim 2 further comprising an isolation apparatus that isolates the DC source from the AC signal source.

6. An optical source according to claim 1 further comprising an optical coupler that directs the reflected optical energy to the detector.

7. An optical source according to claim 6 wherein the optical coupler comprises a wavelength division multiplexer.

8. An optical source according to claim 1 further comprising an optical filter for blocking, in the reflected optical energy, wavelengths outside of a certain range surrounding the particular wavelength.

9. An optical source according to claim 1 further comprising an optical isolator through which the optical signal from the optical generator passes prior to reaching the resonant cavity.

10. An optical source according to claim 1 wherein the optical generator comprises an optical fiber gain medium.

11. An optical gain apparatus comprising:
   an optical pump source generating optical pump energy having a time-varying intensity and directing it in a first direction along an optical path;
   an optical gain medium capable of being pumped by optical energy at a pump wavelength, the gain medium receiving optical pump energy directed in the first direction along the optical path;
   a resonant pumping cavity that resonates optical pumping energy through the optical gain medium while reflecting a portion of the pump energy that is directed toward the gain medium, the reflected energy following a direction opposite the first direction such that the reflected optical energy interacts with the pump energy, the reflection being such that a phase shift between the time-varying intensity of the optical pump energy and a time-varying intensity of the reflected optical energy is minimized when the pump energy has a primary wavelength equal to the pump wavelength;
   a detector that detects optical energy that has been reflected by the resonant pumping cavity and has interacted with the pump energy, and converts it to a feedback signal indicative of said phase shift; and
   a feedback apparatus that provides an input signal to the optical pump source in response to the feedback signal, the input signal causing the output wavelength of the optical source to be adjusted toward the pump wavelength.

12. An optical gain apparatus according to claim 11 further comprising a DC source and an AC signal source that both contribute to the input signal.

13. An optical gain apparatus according to claim 12 wherein the feedback apparatus comprises a mixer that combines the feedback signal and a signal from the AC signal source to generate a DC offset signal that contributes to the input signal.

14. An optical gain apparatus according to claim 14 wherein, when said phase shift has a non-zero value in a first phase direction, the DC offset signal has a negative value, and decreases a total DC signal input to the pump source, and when said phase shift has a non-zero value in a second phase direction, the DC offset signal has a positive value, and increases the total DC signal input to the pump source.

15. An optical gain apparatus according to claim 11 wherein the resonant cavity contains optical energy at the pump wavelength.

16. An optical gain apparatus according to claim 11 wherein the optical pump source comprises an optical fiber gain medium.

17. An optical source for providing a wavelength-stabilized optical output to a resonant pumping cavity that resonates optical pumping energy through an optical gain medium and from which a small amount of optical energy is reflected back toward the source, the reflection being such that a phase shift between a time-varying intensity of the optical energy directed toward the resonant pumping cavity and a time-varying intensity of the reflected optical energy is minimized when a primary wavelength of the optical energy directed toward the resonant pumping cavity is centered about a peak reflectivity wavelength of the resonant pumping cavity, the optical source comprising:
   an optical signal generator generating optical source energy having a time-varying intensity and directing it toward the resonant pumping cavity;
   a detector that detects optical energy reflected from the cavity and converts it to a feedback signal indicative of said phase shift; and
   a feedback apparatus that provides an input signal to the optical signal generator in response to the feedback signal, the input signal causing the output wavelength of the optical signal generator to be adjusted toward the particular wavelength.

18. An optical source according to claim 17 wherein the optical signal generator comprises a doped optical fiber and a semiconductor diode.

19. An optical source according to claim 17 wherein a time-varying input signal is input to the optical signal generator that comprises contributions from a DC source and an AC signal source.

20. An optical source according to claim 19 wherein the feedback apparatus comprises an mixer that combines the feedback signal with an AC current from the AC signal source to generate a DC offset signal input to the optical signal generator.

21. An optical source according to claim 20 wherein, when said phase shift has a non-zero value in a first phase direction, the DC offset signal has a negative value, thereby decreasing the total DC signal input to the optical signal generator, and when said phase shift has a non-zero value in a second phase direction, the DC offset signal has a positive value, thereby increasing the total DC signal input to the optical signal generator.

22. An optical source according to claim 19 further comprising an apparatus that isolates the DC source from the AC signal source.

23. An optical source according to claim 17 further comprising an optical filter for blocking, in the reflected optical energy, wavelengths outside of the particular wavelength range from reaching the detector.

24. An optical source according to claim 17 further comprising an optical coupler that directs the reflected optical energy to the detector.

25. An optical source according to claim 17 further comprising an optical isolator through which the optical signal from the optical signal generator passes prior to reaching the device.

26. An optical source according to claim 17 wherein the optical signal generator comprises an optical fiber gain medium.

27. A method for generating a wavelength-stable optical signal, the method comprising:
   generating, with an optical generator, optical source energy having a timevarying intensity and directing it in a first direction along an optical path;
   reflecting a portion of the source energy from a resonant pumping cavity that pumps a gain medium. the reflection being in a direction opposite the first direction such that the reflected optical energy interacts with the source energy, the reflection being such that a phase shift between the time-varying intensity of the optical source energy and a time-varying intensity of the reflected optical energy is minimized when the source energy has a particular primary wavelength;

detecting optical energy that has been reflected by the resonant pumping cavity and has interacted with the source energy, and converting it to a feedback signal indicative of said phase shift; and directing the feedback signal to a feedback apparatus that provides an input signal to the optical generator in response to the feedback signal, the input signal causing the output wavelength of the optical generator to be adjusted toward the particular wavelength.

28. A method according to claim 27 further comprising generating a DC signal and an AC signal that contribute to the input signal.

29. A method according to claim 28 further comprising combining the feedback signal and a predetermined AC signal with a mixer to generate a DC offset signal that contributes to the input signal.

30. A method according to claim 29 wherein, when said phase shift has a non-zero value in a first phase direction, the DC offset signal has a negative value, thereby decreasing the total DC signal input to the optical generator, and when said phase shift has a non-zero value in a second phase direction, the DC offset signal has a positive value, thereby increasing the total DC signal input to the optical generator.

31. A method according to claim 27 wherein generating optical source energy comprises generating optical source energy with an optical generator that uses a optical fiber gain medium.

32. A method of providing an amplified optical signal output, the method comprising:

generating, with an optical pump source, optical pump energy having a time-varying intensity and directing it in a first direction along an optical path toward a resonant pumping cavity that resonates optical energy at a pump wavelength through an optical gain medium;

reflecting a portion of the pump energy that is directed toward the resonant pumping cavity, the reflected energy following a direction opposite the first direction such that the reflected optical energy interacts with the pump energy, the reflection being such that a phase shift between the time-varying intensity of the optical pump energy and a time-varying intensity of the reflected optical energy is minimized when the pump energy has a primary wavelength equal to the pump wavelength;

detecting optical energy that has been reflected and has interacted with the pump energy, and converting it to art feedback signal indicative of said phase shift; and providing an input signal to the optical pump source in response to the feedback signal so as to cause the output wavelength of the optical pump source to be adjusted toward the pump wavelength.

33. A method according to claim 32 further comprising contributing to the input signal with a DC signal and an AC signal.

34. A method according to claim 33 further comprising combining the feedback signal with the AC signal to generate a DC offset signal that contributes to the input signal.

35. A method according to claim 34 wherein, when said phase shift has a non-zero value in a first phase direction, the DC offset signal has a negative value, thereby decreasing a total DC signal input to the pump source, and when said phase shift has a non-zero value in a second phase direction, the DC offset signal has a positive value, thereby increasing the total DC signal input to the pump source.

36. A method according to claim 32 wherein generating optical pump energy comprises generating optical pump energy with an optical pump source that comprises an optical fiber gain medium.

37. A method of providing wavelength-stabilized optical energy to a resonant pumping cavity that pumps an optical gain medium and from which a small amount of the optical energy is reflected, the reflection being such that a phase shift between a time-varying intensity of the optical energy directed toward the resonant pumping cavity and a time-varying intensity of the reflected optical energy is minimized when a primary wavelength of the optical energy directed toward the resonant pumping cavity is centered about a particular wavelength, the method comprising:

generating, with an optical signal generator, optical source energy having a time-varying intensity and directing it toward the resonant pumping cavity;

detecting optical energy reflected from the resonant pumping cavity and converting it to a feedback signal indicative of said phase shift; and providing an input signal to the optical signal generator in response to the feedback signal, the input signal causing an output wavelength of the optical signal generator to be adjusted toward the particular wavelength.

38. A method according to claim 37 wherein generating optical source energy comprises generating optical source energy with an optical signal generator that comprises a doped optical fiber and a semiconductor diode.

39. A method according to claim 38 wherein the input signal comprises contributions from a DC source and an AC signal source.

40. A method according to claim 39 further comprising combining the feedback signal with the AC signal to generate a DC offset signal that contributes to the input signal.

41. A method according to claim 40 wherein, when said phase shift has a non-zero value in a first phase direction, the DC offset signal has a negative value, thereby decreasing the total DC signal input to the optical signal generator, and when said phase shift has a non-zero value in a second phase direction, the DC offset signal has a positive value, thereby increasing the total DC signal input to the optical signal generator.

42. A method according to claim 37 wherein generating optical source energy comprises generating optical source energy with an optical signal generator that comprises an optical fiber gain medium.

* * * * *